Aug. 25, 1959 R. F. BAIRD 2,900,658
WINDSHIELD WIPER MOUNTING
Filed May 28, 1952 2 Sheets-Sheet 1

INVENTOR.
Richard F. Baird.
BY
Harness and Harris
ATTORNEYS.

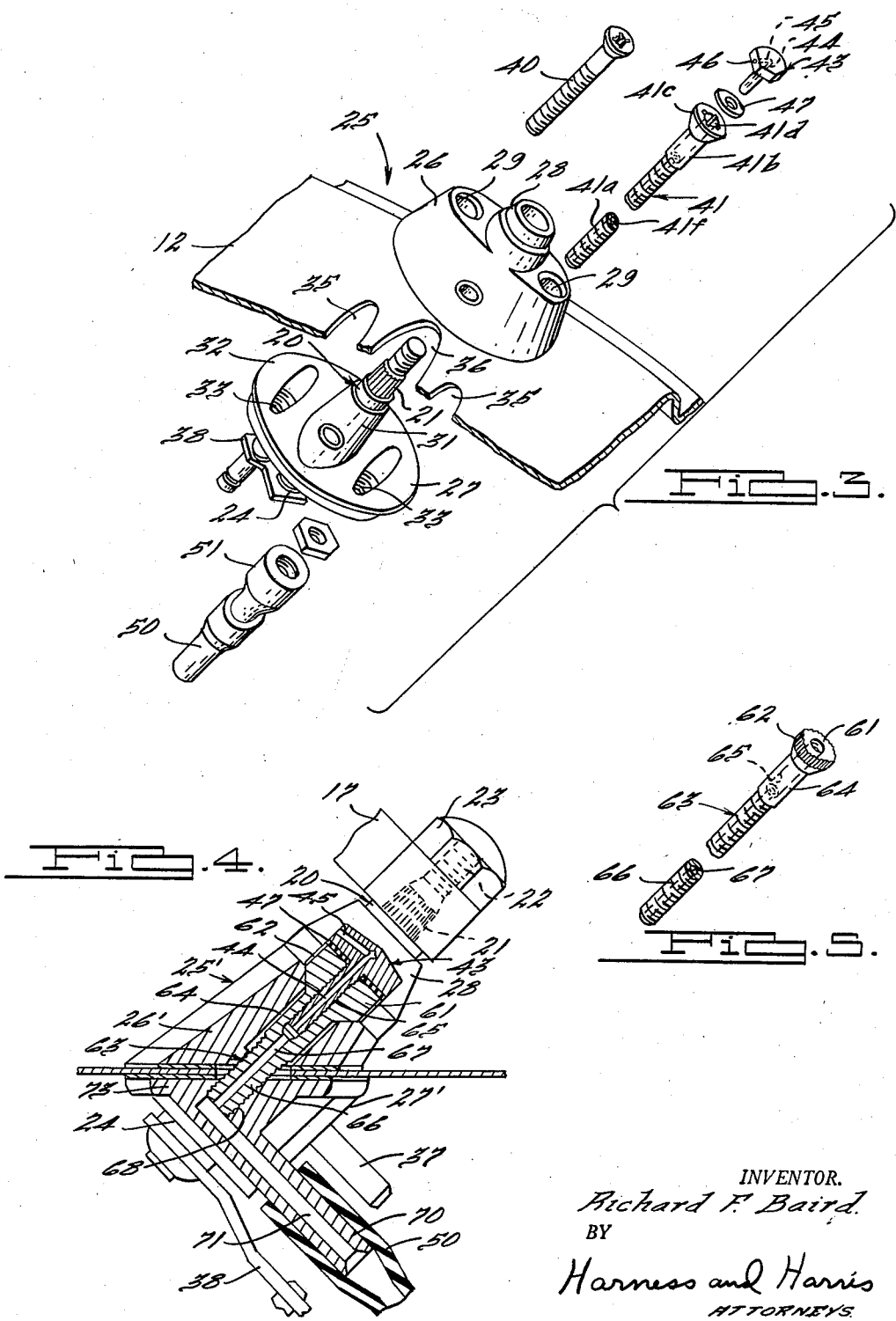

United States Patent Office 2,900,658
Patented Aug. 25, 1959

2,900,658

WINDSHIELD WIPER MOUNTING

Richard F. Baird, Royal Oak, Mich., assignor to Chrysler Corporation, Highland Park, Mich., a corporation of Delaware Application May 28, 1952, Serial No. 290,528

5 Claims. (Cl. 15—250.4)

This invention relates to a mounting means for the rotatable wiper blade supporting shaft of a window wiper mechanism and particularly to the bolt element utilized to fasten such a mounting means in position.

It is particularly advantageous to have a liquid spraying apparatus associated with the oscillatible window wiper blading so that some form of window cleaning liquid may be deposited on the window surface for dispersion thereabouts by the oscillatible wiper blades. The many advantages resulting from the use of a cleaning fluid in combination with the oscillatible wiper blade are thought to be obvious and to not require further explanation. Obviously, the simpler the liquid spraying equipment, the more attractive it is to both the manufacturer and the user for the cost of such equipment will thereby be reduced and thus the device can be used by many more persons.

It is an object of this invention to provide a novel window wiper mounting means that materially simplifies the association of a liquid spray system with an oscillatible window wiper mechanism.

It is another object of this invention to provide a mounting bolt for the wiper blade rockshaft bearing element that serves a dual function of a bearing mounting means and a liquid conduit and spray jet for the associated liquid spray equipment.

It is still another object of this invention to provide a novel type of readily adjustable liquid spray head and supporting conduit means.

It is a further object to provide a novel connection between a spray jet or head and its supporting conduit member.

It is still another object of this invention to provide a mounting bolt having a conduit extending therethrough and an adjustable spray jet mounted on said bolt that is connectible to the bolt conduit means in a plurality of positions.

It is a further object to provide a window wiper mechanism having a liquid spray system associated therewith that is simple in design and utilizes a combination bearing mounting anchor bolt and liquid spray head.

Other objects and advantages of this invention will become readily apparent from a reading of the following description and a consideration of the related drawings wherein:

Fig. 3 is an exploded perspective view of the windshield wiper mounting means shown in Figs. 1 and 2;

Fig. 4 is a sectional elevational view of a modified form of this invention; and Fig. 5 is a perspective view, partly in section, of one of the mounting bolts used in the form of the invention shown in Fig. 4.

Figure 1:
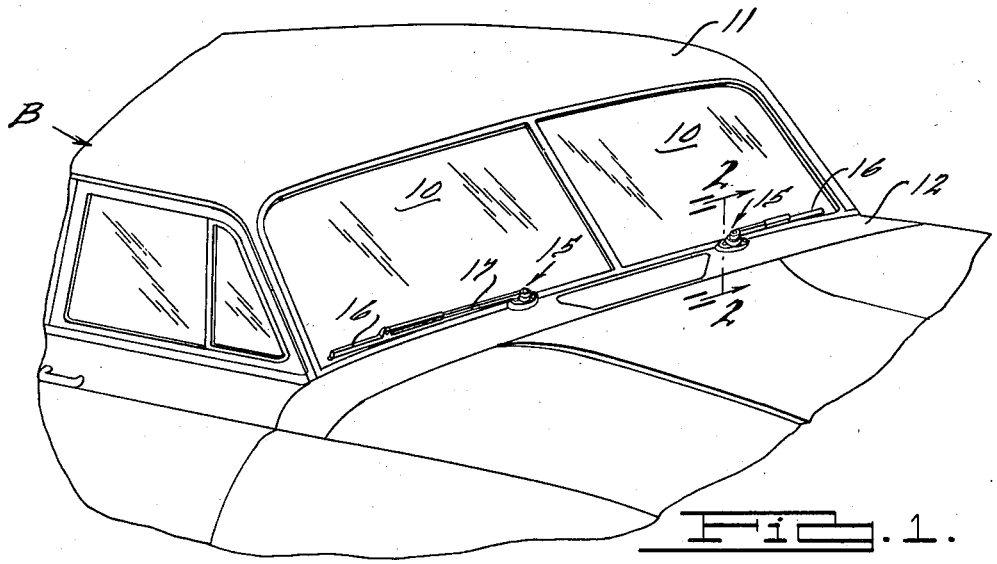
Fig. 1 is a fragmentary perspective view of the front end of a motor vehicle having windshield wiper equipment associated therewith that embodies this invention.

In the drawings B represents a motor vehicle body that has windshield window panels 10, 10 extending across the front end thereof between the body roof 11 and the cowl panel 12. Seated in the cowl panel 12, adjacent each windshield window panel 10, is a window wiper mechanism 15. The wiper mechanisms 15 are identical so only one will be described. Wiper mechanism 15 comprises a wiper blade 16 that is carried by a blade supporting arm 17. The blade supporting arm 17 has its lower end 17a (see Figs. 2 and 3) drivingly connected to the splined portion 21 of a rotatable rockshaft 20. The outer end 22 of the rockshaft 20 is reduced in diameter and threaded to receive a nut element 23. Nut 23 prevents axial movement of the blade supporting arm 17 along the rockshaft 20.

Rockshaft 20 is journaled in a dome-like bearing mounting 25. The dome-like bearing mounting 25 comprises an outer shell-like or female part 26 and an inner plug or male part 27 (see Fig. 3). The outer shell part 26 of the bearing mounting 25 has a tubular collar portion 28 that receives the outer end portions of the rockshaft 20. The shell part 26 is also pierced by a pair of bolt receiving openings 29. The plug-like inner part 27 of the bearing mounting 25 has an upstanding tubular neck portion 31 that journals the inner end portions of the rockshaft 20. The base portion 32 of the plug-like inner part 27 is pierced by a pair of threaded bolt receiving openings 33 that are alignable with the openings 29 in the outer shell part 26 when parts 26 and 27 are assembled together.

When the window wiper mechanism is to be mounted on a vehicle or any other window supporting element, the shell-like outer part 26 of bearing mounting 25 is placed on the upper side of the cowl 12 (see Fig. 3) with its openings 29, 29 and its tubular collar 28 aligned with the openings 35, 35 and 36 respectively in the cowl 12. Next the plug-like inner part 27 of bearing mounting 25 is placed beneath the cowl 12 with its openings 33, 33 and its rockshaft seating neck 31 aligned with the openings 35, 35 and 36 respectively in the cowl 12. The outer end of the rockshaft 20 is then pushed through the cowl opening 36 and through the tubular collar 28 in the outer shell part 26. Thereafter the mounting bolts 40 and 41, subsequently described in detail, are threaded through the aligned openings 29 and 33 so as to secure the bearing mounting parts 26, 27 together with the cowl element clamped therebetween. In order to insure a leak-proof seal around the mounting parts 25, 26 and the associated portions of cowl 12, resilient washer elements 42, 42 may be placed between bearing mounting parts 26, 27 and the associated cowl portions.

The inner plug-like part 27 of the bearing mounting 25 may be formed with a positioning stud 37 that is adapted to seat in a mating body opening (not shown) so as to assist in the positioning and anchoring of the bearing mounting 25 in its intended location. Projecting from the lower side of the plug-like bearing part 27 is the inner end 24 of the rockshaft 20. Drivingly connected to the inner end 24 of the rockshaft 20 is a crank arm 38. Crank arm 38 is connected by a connecting rod 39 to a suitable motor means (not shown) which motor means is operable to effect oscillation of the rockshaft 20.

The majority of the structure heretofore described is more or less conventional in the window wiper art with the exception of the mounting screw 41. It is the mounting screw 41 and its manner of association with the other elements of the wiper assembly that embodies the major part of this invention. In order to apply a liquid spray to the outer surface of each of the window panels 10, it is necessary to locate liquid spray jets or spray heads on the outer side of the vehicle body in positions such that the jets can direct a stream of window cleaning liquid across those portions of each window panel 10 that are swept by the oscillatible wiper blades 16. In the past it has been common to use separate jet assemblies that are mounted on the cowl 12 or on the roof 11 and these jet assemblies necessitated piercing the vehicle body at additional points and then sealing these openings after installation of the spray jets. It is obvious that such an installation was relatively costly and in addition it tended to mar the appearance of the vehicle or whatever object contained the wiper unit. By utilization of the invention herein disclosed, it is possible to eliminate separate spray jet assemblies and the mounting means therefor due to the fuel function of the mounting bolts 41.

Figure 2:
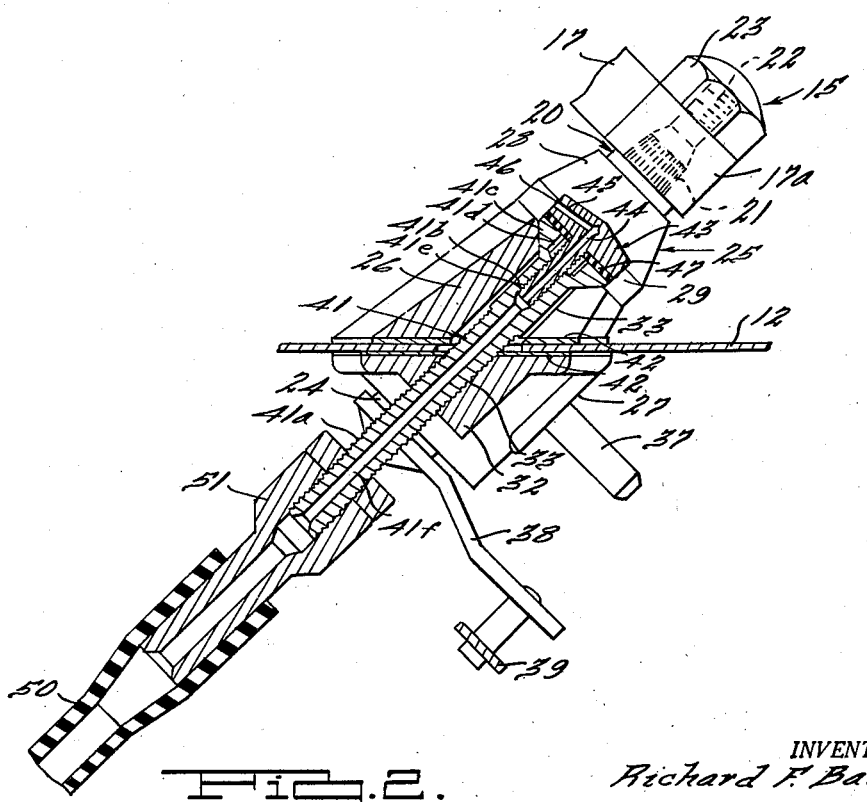
Fig. 2 is an enlarged sectional elevational view of the windshield wiper mounting means, the view being taken along the line 2—2 of Fig. 1.

From Figs. 2 and 3, it will be noted that the anchor bolt 41 has a relatively long threaded shank portion 41a, a relatively short unthreaded shank portion 41b and a flat head screw type of head portion 41c. The head portion 41c is pierced axially by a relatively large tool receiving opening 41d. Tool receiving opening 41d is connected to a reduced diameter, threaded, axially extending bore 41e that pierces the unthreaded shank portion 41b of the bolt 41. The threaded bore 41e in the shank portion 41b is connected to an axially extending bore 41f that pierces the threaded shank portion 41a from end to end. From the above description and a consideration of Figs. 2 and 3, it is obvious that the anchor bolt 41 provides a liquid conduit for transmitting cleaner fluid or the like from the inside to the outside of the vehicle body.

Threadably connected to the outer end or head portion 41c of the bolt 41 is a liquid spray jet or spray head element 43. This spray jet 43 is essentially a bolt having a passage 44 extending axially of the threaded bolt shank portion which passage 44 joins another passage 45 that extends laterally or transversely of the head portion of the bolt 43. It will be noted that when the spray jet bolt 43 is threadably mounted in the bore 41e of the anchor bolt 41 that the bores 45, 44 of the jet bolt 43 are connected to the bore 41f of the anchor bolt 41. Furthermore, as the size of the end opening or port 46 of the passage 45 in the spray bolt 43 is relatively small, it is obvious that when liquid is forced through conduits 41f, 44, 45 that a fine spray will be emitted from the port 46. By rotating the spray bolt 43 to the proper position the spray stream emitted from port 46 can be directed across any selected portion of the window panel 10. To provide a simplified positive means for anchoring the spray bolt head in its selected position, there is mounted on the shank of the spray bolt 43 a resilient, relatively thick, washer element 47. By means of washer 47 the spray bolt 43 may be turned up against the head 41c of the anchor bolt and maintained in any selected position relative thereto. Obviously some other types of lockwashers can be substituted for the resilient washer 47 in the assembly herein disclosed.

By the use of the combination bearing mounting screw and spray jet support element 41, mechanism as well as labor is saved and the appearance of the vehicle or wiper support is not marred as is the case when separate spray jet assemblies are used. In addition, the simplicity of the spray jet 41, 43 and the ready adjustability of the spray head 43 relative to its support screw 41 are features that make this invention particularly attractive. To convert a standard wiper mechanism to a combination wiper and spray jet device, it is merely necessary to replace one of the bearing mounting anchor bolts with a dual function anchor bolt such as the bolt 41 and its attached spray head bolt 43 and to then connect a piece of flexible conduit such as the conduit 50 (see Fig. 2) to the inner end of the bored bolt 41. A fitting 51 may be threadably connected to the inner end of the bolt 41 and the conduit 50 connected to the fitting 51 rather than to the bolt 41 directly. A fluid supply container (not shown) is connected to the conduit 50 and some form of pump (not shown) is utilized to force the cleaner fluid from the supply source to the spray head 43. This pump (not shown) may be either automatically operable or controlled by the operator of the vehicle or object mounting the described window wiper assembly.

In Figs. 4 and 5 is shown a modified form of the invention shown in Figs. 1-3. The Figs. 4 and 5 form of the invention is similar to the Figs. 1-3 form in many respects and all parts of the two forms of the invention that are identical have been assigned the same reference numerals. The outer shell part 26' of the bearing mounting 25' is identical to the part 26 shown in Figs. 1-3. Anchor bolt 63, that is used to secure the mounting parts 26', 27' together, has an elongated head portion 61 that is knurled around its outer periphery 62 to facilitate turning of the bolt 63. Anchor bolt 63 is considerably shorter in overall length than the anchor bolt 41 but it is formed in substantially the same manner as bolt 41. Bolt 63 has an unthreaded upper shank portion 64 that is pierced axially by a threaded bore 65 which bore 65 also extends through the screw head 61. The threaded lower shank portion 66 of the bolt 61 is also pierced by an axially extending bore 67 that is joined to the upper shank bore 65. As was the case in the Figs. 1-3 form of the invention, a spray jet bolt 43 has its threaded shank portion screwed into the threaded upper bore 65 of the anchor bolt 63. The passages 44 and 45 of spray jet bolt 43 are connected to the bore 67 in anchor bolt 63 when the bolts 43 and 63 are assembled. A resilient lock washer element 47 is mounted on spray jet bolt 43 so as to be clamped against the head 61 of anchor bolt 63 when the bolts 43, 63 are assembled together.

The plug-like lower or inner part 27' of the mounting means 25' is similar to the part 27 of Figs. 1-3 in that part 27' includes a rockshaft bearing neck portion (not shown) and a pair threaded bolt receiving bores 68 that are adapted to receive the threaded lower ends 66 of the anchor bolts 63. Mounting part 27' is formed with a neck 70 that is pierced by a bore 71. Neck 70 is adapted to receive the flexible fluid supply conduit 50. The bore 71 in neck 70 extends inwardly through the body portion 73 of part 27' so that it joins the bolt receiving bore 68 in part 27'. With bore 70 connected to threaded bore 68 fluid may be passed through bore 70 to the bore 67 in bolt 63 and up to the passages 44, 45 in the spray jet bolt 43. The Figs. 4 and 5 form of the invention is somewhat more compact and contains less parts than the form of the invention shown in Figs. 1-3 but the several objects and advantages of this invention are achieved with either form of the invention.

I claim:

1. A window wiper mechanism including a wiper blade, a blade supporting arm, a rotatable shaft connected to said arm to effect oscillation thereof, and a multi-part bearing mounting for said shaft comprising a pair of complemental parts adapted to be mounted on opposite sides of a support to clampingly engage the support therebetween, and a removable anchor bolt having a threaded shank extending through and connecting the superimposed bearing mounting parts and the intermediate support, said anchor bolt having an integral fluid passage extending axially of the length of the bolt shank and a liquid spray means mounted on the exposed head end of said bolt and operably connected by internal conduit means to the fluid passage through said bolt shank.

2. A window wiper mechanism including a wiper blade, a blade supporting arm, a rotatable shaft connected to said arm to effect oscillation thereof, and a multi-part bearing mounting for said shaft comprising a pair of complemental parts adapted to be mounted on opposite sides of a support to clampingly engage the support therebetween, and a movable anchor bolt having a threaded shank extending through and connecting the superimposed bearing mounting parts and the intermediate support, said anchor bolt having an integral fluid passage extending axially of the length of the bolt shank and a liquid spray means mounted on the exposed head end of said bolt and operably connected to the fluid passage through said bolt shank, said spray means comprising a nozzle element that is threadably connected to the said head end of said anchor bolt and connected by internal conduit means to the passage in the bolt shank.

3. A window wiper mechanism including a wiper blade, a blade supporting arm, a motion transmitting means connected to said arm to effect oscillation thereof, and a mounting for said motion transmitting means comprising a part to be mounted on a support and a removable anchor bolt to fixedly connect said part to said support, said anchor bolt having an internal fluid conduit extending axially through the shank portion thereof and nozzle means mounted on the head of said anchor bolt and connected by internal conduit means to the fluid conduit in the anchor bolt shank portion to provide means for passing fluid through said anchor bolt and emitting it from said nozzle means in the form of a spray stream, said nozzle means comprising a second bolt threaded into the head of said anchor bolt and having passages therethrough connectible to the fluid conduit piercing said anchor bolt shank portion, said second bolt having a resilient washer element mounted on the shank portion thereof and arranged to be compressed between the head portion of the second bolt and portions of the head of the anchor bolt to provide adjustable means to control the direction of the spray stream emitted from said nozzle means.

4. A window wiper mechanism including a wiper blade, a blade supporting arm, a motion transmitting means connected to said arm to effect oscillation thereof, and a mounting for said motion transmitting means comprising a part to be mounted on a support and a removable anchor bolt to fixedly connect said part to said support, said anchor bolt having an internal fluid conduit extending axially through the shank portion thereof and nozzle means mounted on the head of said anchor bolt and connected by internal conduit means to the fluid conduit in said bolt shank to provide means for passing fluid through said anchor bolt and emitting it from said nozzle means in the form of a spray stream, said nozzle means comprising a second bolt threaded into the head of said anchor bolt and having passages therethrough connectible to the internal fluid conduit extending axially through said anchor bolt shank portion.

5. In a vehicle window cleaner, a wiper shaft supporting housing for mounting on a vehicle body adjacent a window therein, a trim piece enclosing said housing, said housing having an anchor seat therein, and a combined washer nozzle and anchor screw member having a trim piece clamping part adjacent its outer end and a tubular anchor screw portion extending therefrom through said anchor seat and into the vehicle body for securing said housing and said trim piece thereto, said member being adapted adjacent its inner end for attachment to a source of washing fluid, and a discharge nozzle carried on the outer end of said member for discharging washing fluid directly onto an associated window.

References Cited in the file of this patent

UNITED STATES PATENTS

| | | |
|---|---|---|
| 2,126,624 | Eaddy | Aug. 9, 1938 |
| 2,153,519 | Horton | Apr. 4, 1939 |
| 2,206,814 | Horton | July 2, 1940 |
| 2,354,440 | Brown | July 25, 1944 |
| 2,609,561 | Wernig | Sept. 9, 1952 |

FOREIGN PATENTS

| | | |
|---|---|---|
| 664,051 | France | Apr. 16, 1929 |